United States Patent
Dawson et al.

(10) Patent No.: US 11,417,229 B2
(45) Date of Patent: Aug. 16, 2022

(54) METHODS OF COORDINATING REMOTE USER ENGAGEMENT AND INSTRUCTIONAL DEMONSTRATIONS

(71) Applicant: Haier US Appliance Solutions, Inc., Wilmington, DE (US)

(72) Inventors: Jedediah Dawson, Crestwood, KY (US); Myles Caley, Crestwood, KY (US); Quinton Burns, Louisville, KY (US); Mark Rondina, Louisville, KY (US); Beau Muniz, Charlottesville, VA (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 26 days.

(21) Appl. No.: 17/029,512

(22) Filed: Sep. 23, 2020

(65) Prior Publication Data

US 2022/0092997 A1    Mar. 24, 2022

(51) Int. Cl.
  *G09B 5/12* (2006.01)
  *G09B 5/06* (2006.01)
  *H04L 12/18* (2006.01)

(52) U.S. Cl.
  CPC .............. *G09B 5/065* (2013.01); *G09B 5/12* (2013.01); *H04L 12/1822* (2013.01); *H04L 12/1881* (2013.01)

(58) Field of Classification Search
  None
  See application file for complete search history.

(56) References Cited

U.S. PATENT DOCUMENTS

| | | | |
|---|---|---|---|
| 9,077,849 B2 | 7/2015 | Meek | |
| 9,148,627 B2 | 9/2015 | Anderson | |
| 9,253,527 B2 | 2/2016 | Hall | |
| 9,935,987 B2 | 4/2018 | Bader-Natal | |
| 9,979,880 B2 | 5/2018 | Michels | |
| 2004/0002049 A1* | 1/2004 | Beavers | G09B 5/00 434/350 |
| 2004/0158614 A1 | 8/2004 | Williams | |
| 2007/0030984 A1* | 2/2007 | Gotfried | H04N 7/147 381/122 |
| 2007/0263821 A1* | 11/2007 | Shaffer | H04M 3/56 379/202.01 |
| 2007/0263824 A1* | 11/2007 | Bangalore | H04N 7/152 379/202.01 |
| 2009/0263777 A1* | 10/2009 | Kohn | G09B 7/00 434/350 |
| 2009/0317784 A1* | 12/2009 | Syou | H04N 21/4722 434/309 |
| 2012/0182384 A1* | 7/2012 | Anderson | H04N 7/147 348/14.09 |

(Continued)

*Primary Examiner* — Steve Rowland
(74) *Attorney, Agent, or Firm* — Dority & Manning, P.A.

(57) ABSTRACT

A method for coordinating remote user engagement and instructional demonstrations may include transmitting an instructor video signal from the instructor device, receiving a communication request from the remote audience device, assigning the remote audience device a queue position for a communication queue according to the received communication request, and indexing one or more audience devices automatically into an active speaker role according to the communication queue. The method may further provide for directing display of a countdown or restricting audio from other devices.

18 Claims, 11 Drawing Sheets

(56) References Cited

U.S. PATENT DOCUMENTS

| | | | |
|---|---|---|---|
| 2014/0053071 A1* | 2/2014 | Penner | G06Q 10/10 |
| | | | 715/732 |
| 2014/0133836 A1* | 5/2014 | Burns | H04N 7/15 |
| | | | 386/278 |
| 2015/0304376 A1* | 10/2015 | Gottlieb | H04N 7/15 |
| | | | 715/719 |
| 2016/0073059 A1* | 3/2016 | Bader-Natal | H04L 65/403 |
| | | | 348/14.03 |
| 2016/0255126 A1* | 9/2016 | Sarris | H04N 7/155 |
| | | | 348/14.08 |
| 2016/0285921 A1 | 9/2016 | Henderson | |
| 2018/0366017 A1* | 12/2018 | Kenny | H04L 65/4015 |
| 2020/0244711 A1 | 7/2020 | Anderson | |

\* cited by examiner

METHODS OF COORDINATING REMOTE USER ENGAGEMENT AND INSTRUCTIONAL DEMONSTRATIONS

FIELD OF THE INVENTION

The present subject matter relates generally to systems and methods for remote instructional demonstrations, and particularly for organizing engagement from remote users with an instructor.

BACKGROUND OF THE INVENTION

With the proliferation of remote communications technologies, there has been an increasing interest in teaching and learning various skills with an instructor and audience members or attendees at disparate geographic locations. Electronic user devices that are connected to the Internet, such as a computer, tablet or smartphone, may allow for more immediate video or audio communication with remote information servers or individuals than would be possible with completely prerecorded instructions. Certain skills in particular, such as cooking, can benefit from direct interaction between an instructor and an attendee. In turn, a remote video call or demonstration may be provided.

Problems exist with this approach, though. For instance, although an attendee may have a recipe or prepared instructions for cooking a specific food item at home, this may be difficult to follow while also paying attention to an instructor. Moreover, it can be very difficult for an instructor or demonstrator to know when a remote user or attendee is falling behind or no longer following guided instruction. An instructor is generally unable to continuously see what stage or step of a recipe a user is on (and vice versa). This problem can be magnified if one instructor seeks to guide several users at once since all of the users may follow at a different pace. Furthermore, one or more of difficulties can be magnified if multiple attendees wish to engage with the instructor or each other simultaneously. For instance, even two individuals (e.g., an instructor and attendee or two attendees) attempting to talk simultaneously during a presentation may make it virtually impossible for any individual to understand what is being said or communicated.

As a result, improved systems are needed for facilitating instructional demonstrations to one or more remote users. In particular, it would be advantageous to provide a system or method for remotely providing an instructional demonstration while ensuring coordinated communication between an instructor and one or more remote users.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, method of coordinating an instructional demonstration between an instructor device and a remote audience device is provided. The method may include transmitting an instructor video signal from the instructor device, receiving a communication request from the remote audience device, assigning the remote audience device a queue position for a communication queue according to the received communication request, and indexing one or more audience devices automatically into an active speaker role according to the communication queue. The method may further include directing display of a countdown at the remote audience device indicating a time period until expiration of a device in the active speaker role; and permitting an audio signal from the remote audience device to the instructor device in response to the remote audience device reaching the active speaker role.

In another exemplary aspect of the present disclosure, method of coordinating an instructional demonstration between an instructor device and a remote audience device is provided. The method may include transmitting an instructor video signal from an instructor device to each remote audience device of a plurality of remote audience devices. The method may further include receiving a communication request from a first device of the plurality of remote audience devices, assigning the first device a queue position for a communication queue according to the received communication request, and indexing one or more audience devices of the plurality of remote audience devices automatically into an active speaker role according to the communication queue. The method yet may further include directing display of the communication queue, including the assigned queue position of the first device and the active speaker role, at the instructor device. The method may still further include restricting display of the communication queue at each remote audience device of the plurality of remote audience devices, permitting an audio signal from the first device to the instructor device in response to the first device reaching the active speaker role, and restricting audio from one or more other audience devices to the instructor device when the first device is in the active speaker role.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
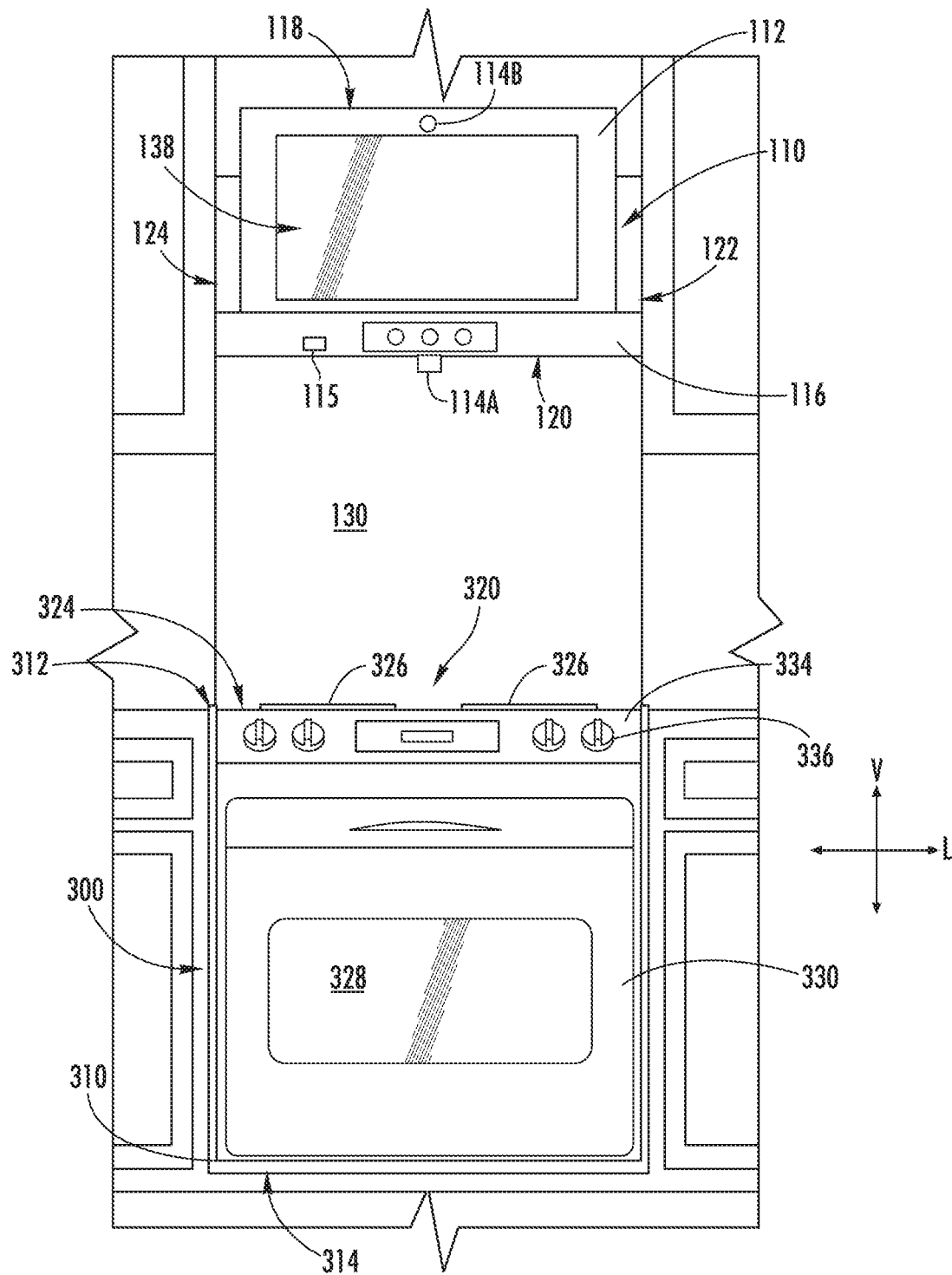
FIG. 1 provides a front perspective view of a remote system according to exemplary embodiments of the present disclosure.
Figure 2:
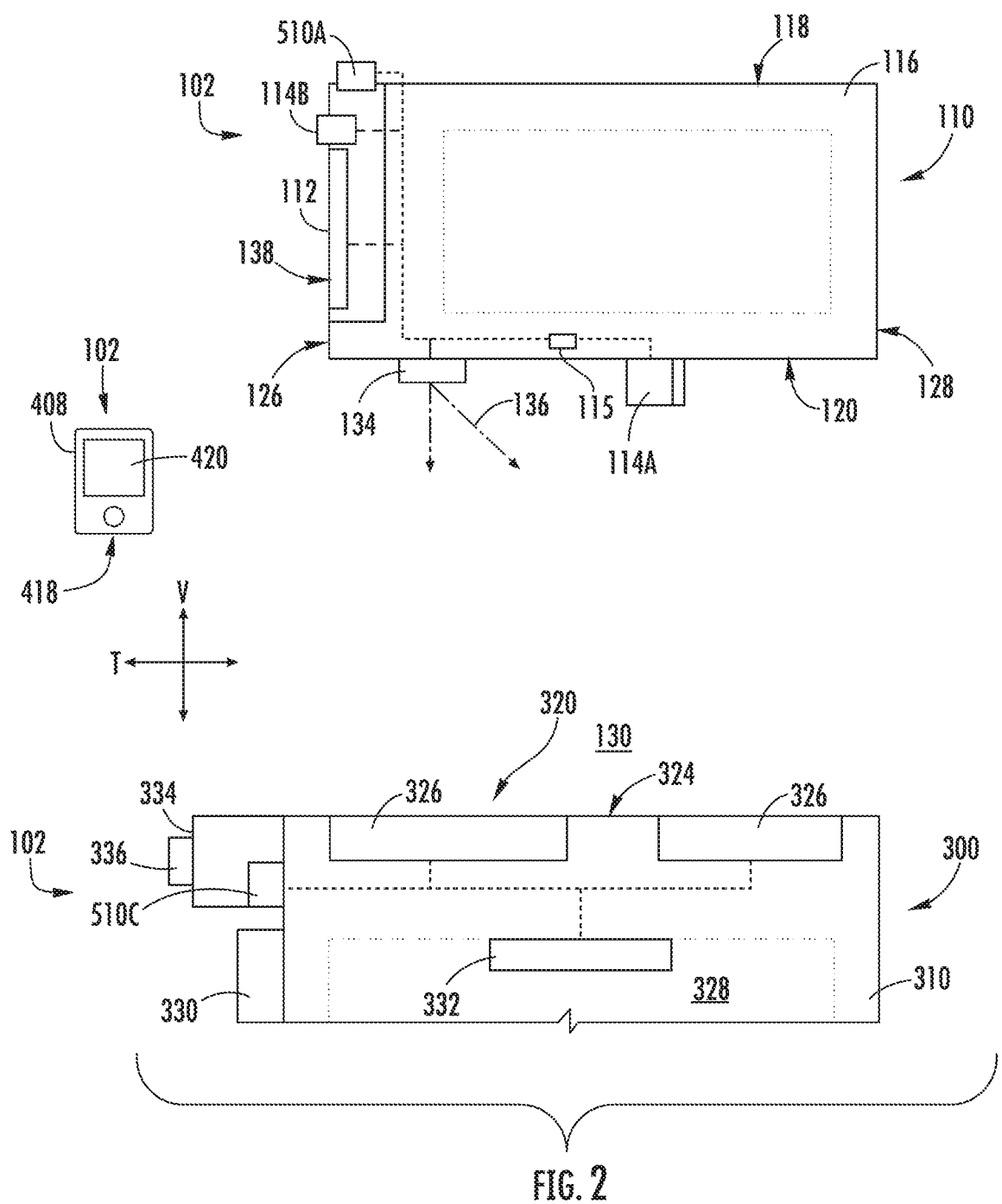
FIG. 2 provides a side schematic view of the exemplary remote system of FIG. 1.
Figure 3:
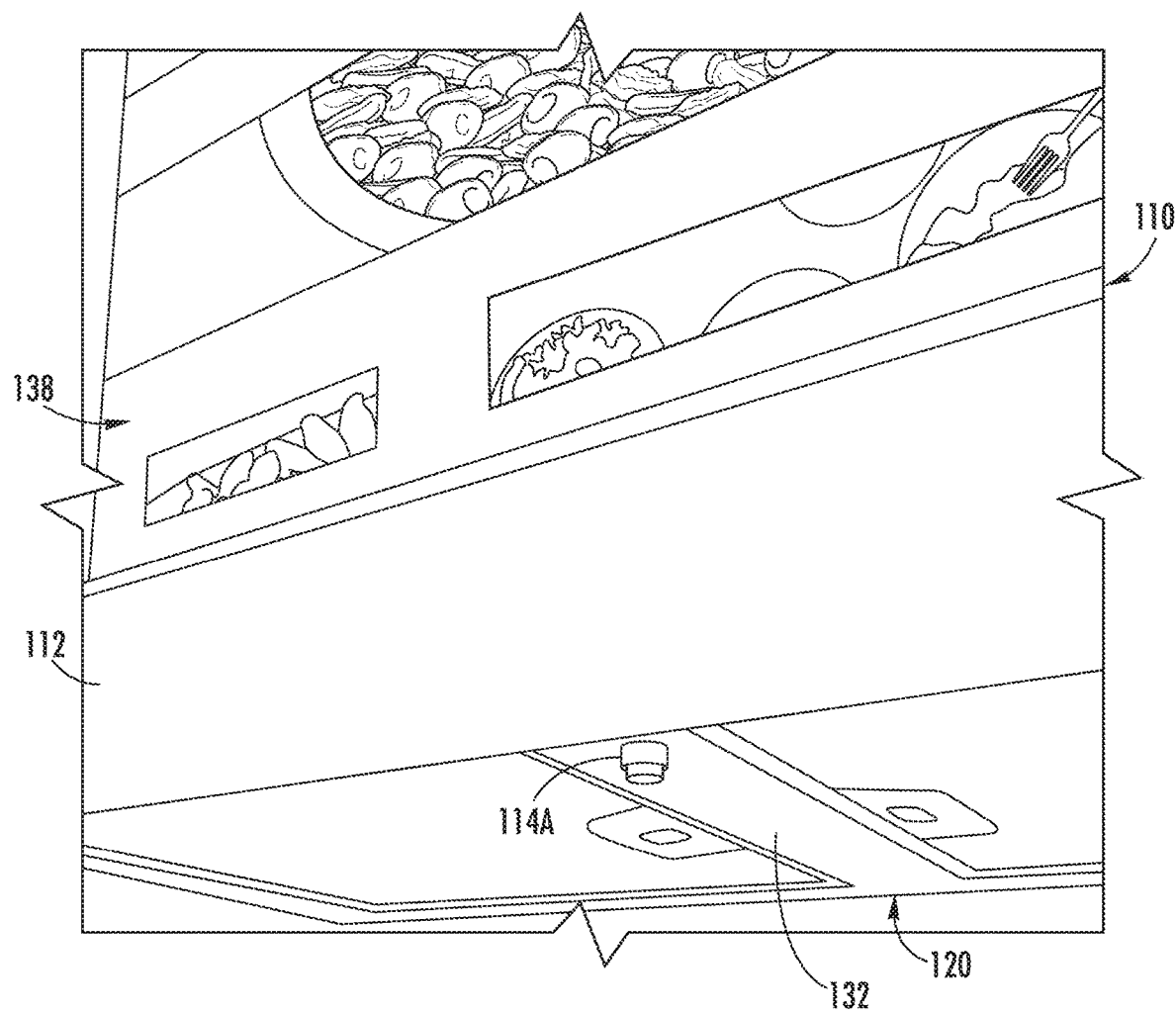
FIG. 3 provides a bottom perspective view of a portion of the exemplary remote system of FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Turning to the figures, FIGS. 1 through 5 provide various views of a system 100 (or portions thereof) according to exemplary embodiments of the present disclosure. System 100 generally includes an instructor device 210 and one or more remote devices 102 (i.e., remote audience devices), which may include, for instance, a stationary interactive engagement assembly 110, mobile user devices 408, or user cooking appliance 300 with which a user may interact or engage. An audience member (i.e., attendee or remote user) may thus use or interact with the remote device 102 while an instructor uses or interacts with the instructor device 210.

In some embodiments, a user cooking appliance 300 is provided as or for a user with a remote device 102. As shown, cooking appliance 300 defines a vertical direction V, a lateral direction L, and a transverse direction T, for example, at a cabinet 310. The vertical, lateral, and transverse directions are mutually perpendicular and form an orthogonal direction system. As shown, cooking appliance 300 extends along the vertical direction V between a top portion 312 and a bottom portion 314; along the lateral direction L between a left side portion and a right side portion; and along the traverse direction T between a front portion and a rear portion.

Cooking appliance 300 can include a chassis or cabinet 310 that defines a cooking zone 320 wherein one or more cooking operations may be performed by a user (e.g., heating or preparing food items according to a recipe or an instructional demonstration). For example, the cooking zone 320 may be defined by a cooktop surface 324 of the cabinet 310. As illustrated, cooktop surface 324 includes one or more heating elements 326 for use in, for example, heating or cooking operations. In exemplary embodiments, cooktop surface 324 is constructed with ceramic glass. In other embodiments, however, cooktop surface 324 may include another suitable material, such as a metallic material (e.g., steel) or another suitable non-metallic material. Heating elements 326 may be various sizes and may employ any suitable method for heating or cooking an object, such as a cooking utensil 322, and its contents. In optional embodiments, for example, heating element 326 uses a heat transfer method, such as electric coils or gas burners, to heat the cooking utensil 322. In another embodiment, however, heating element 326 uses an induction heating method to heat the cooking utensil 322 directly. In turn, heating element 326 may include a gas burner element, resistive heat element, radiant heat element, induction element, or another suitable heating element.

In some embodiments, cooking appliance 300 includes an insulated cabinet 310 that defines a cooking chamber 328 selectively covered by a door 330. One or more heating elements 332 (e.g., top broiling elements or bottom baking elements) may be enclosed within cabinet 310 to heat cooking chamber 328. Heating elements 332 within cooking chamber 328 may be provided as any suitable element for cooking the contents of cooking chamber 328, such as an electric resistive heating element, a gas burner, microwave element, halogen element, etc. Thus, cooking appliance 300 may be referred to as an oven range appliance. As will be understood by those skilled in the art, cooking appliance 300 is provided by way of example only, and the present subject matter may be used in any suitable cooking appliance 300, such as a double oven range appliance, standalone oven, or a standalone cooktop (e.g., fitted integrally with a surface of a kitchen counter). Thus, the exemplary embodiments illustrated in figures are not intended to limit the present subject matter to any particular cooking chamber or heating element configuration, except as otherwise indicated.

As illustrated, a user interface or user interface panel 334 may be provided on cooking appliance 300. Although shown at the front portion of cooking appliance 300, another suitable location or structure (e.g., a backsplash) for supporting user interface panel 334 may be provided in alternative embodiments. In some embodiments, user interface panel 334 includes input components or controls 336, such as one or more of a variety of electrical, mechanical, or electro-mechanical input devices. Controls 336 may include, for example, rotary dials, knobs, push buttons, and touch pads. A controller 510C is in communication with user interface panel 334 and controls 336 through which a user may select various operational features and modes and monitor progress of cooking appliance 300. In additional or alternative embodiments, user interface panel 334 includes a display component, such as a digital display in communication with a controller 510C and configured to provide operational feedback to a user. In certain embodiments, user interface panel 334 represents a general purpose I/O ("GPIO") device or functional block.

As shown, controller 510C is communicatively coupled (i.e., in operative communication) with user interface panel 334 and its controls 336. Controller 510C may also be communicatively coupled with various operational components of cooking appliance 300 as well, such as heating elements (e.g., 326, 332), sensors, etc. Input/output ("I/O") signals may be routed between controller 510C and the various operational components of cooking appliance 300.

Thus, controller 510C can selectively activate and operate these various components. Various components of cooking appliance 300 are communicatively coupled with controller 510C via one or more communication lines such as, for example, conductive signal lines, shared communication busses, or wireless communications bands.

In some embodiments, controller 510C includes one or more memory devices 514C and one or more processors 512C. The processors 512C can be any combination of general or special purpose processors, CPUs, or the like that can execute programming instructions or control code associated with operation of cooking appliance 300. The memory devices 514C (i.e., memory) may represent random access memory such as DRAM or read only memory such as ROM or FLASH. In one embodiment, the processor 512C executes programming instructions stored in memory 514C. The memory 514C may be a separate component from the processor 512C or may be included onboard within the processor 512C. Alternatively, controller 510C may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 510C includes a network interface 520C such that controller 510C can connect to and communicate over one or more networks (e.g., network 502) with one or more network nodes. Controller 510C can also include one or more transmitting, receiving, or transceiving components for transmitting/receiving communications with other devices communicatively coupled with cooking appliance 300. Additionally or alternatively, one or more transmitting, receiving, or transceiving components can be located off board controller 510C. Generally, controller 510C can be positioned in any suitable location throughout cooking appliance 300. For example, controller 510C may be located proximate user interface panel 334 toward the front portion of cooking appliance 300.

As shown, an interactive assembly 110 having one or more casings (e.g., hood casing 116) may be provided above cooking appliance 300 along the vertical direction V. For example, a hood casing 116 may be positioned above cooking appliance 300 in a stationary mounting (e.g., such that operation of interactive assembly 110 is not permitted unless casing 116 is mounted at a generally fixed or non-moving location). Hood casing 116 includes a plurality of outer walls and generally extends along the vertical direction V between a top end 118 and a bottom end 120; along the lateral direction L between a first side end 122 and a second side end 124; and along the transverse direction T between a front end 126 and a rear end 128. In some embodiments, hood casing 116 is spaced apart from cooking zone 320 or cooktop surface 324 along the vertical direction V. An open region 130 may thus be defined along the vertical direction V between cooking zone 320 or cooktop surface 324 and bottom end 120.

In optional embodiments, hood casing 116 is formed as a range hood. A ventilation assembly within hood casing 116 may thus direct an airflow from the open region 130 and through hood casing 116. However, a range hood is provided by way of example only. Other configurations may be used within the spirit and scope of the present disclosure. For example, hood casing 116 could be part of a microwave or other appliance designed to be located above cooking appliance 300 (e.g., directly above cooktop surface 324). Moreover, although a generally rectangular shape is illustrated, any suitable shape or style may be adapted to form the structure of hood casing 116.

In certain embodiments, one or more camera assemblies 114A, 114B are provided (e.g., as part of interactive assembly 110) to capture images (e.g., static images or dynamic video) of a portion of cooking appliance 300 or an area adjacent to cooking appliance 300. Generally, each camera assembly 114A, 114B may be any type of device suitable for capturing a picture or video. As an example, each camera assembly 114A, 114B may be a video camera or a digital camera with an electronic image sensor [e.g., a charge coupled device (CCD) or a CMOS sensor]. A camera assembly 114A or 114B is generally provided in operable communication with controller 510A such that controller 510A may receive an image signal (e.g., video signal) from camera assembly 114A or 114B corresponding to the picture(s) captured by camera assembly 114A or 114B. Once received by controller 510A, the image signal (e.g., video signal) may be further processed at controller 510A (e.g., for viewing at an image monitor 112) or transmitted to a separate device (e.g., remote server 404) "live" or in real-time for remote viewing (e.g., at instructor device 210). In certain embodiments, one or more microphones 115 (e.g., dynamic microphone, ribbon microphone, fiber-optic microphone, piezoelectric microphone, etc.) may be provided (e.g., on hood casing 116) to capture and transmit audio signal(s). Optionally, a microphone 115 may be associated with one or more of the camera assemblies 114A, 114B to capture and transmit audio signal(s) coinciding (or otherwise corresponding) with the captured image signal or picture(s).

In some embodiments, one camera assembly (e.g., first camera assembly 114A) is directed at cooking zone 320 (e.g., cooktop surface 324). In other words, first camera assembly 114A may be oriented to capture light emitted or reflected from cooking zone 320 through the open region 130. In some such embodiments, first camera assembly 114A can selectively capture an image covering all or some of cooktop surface 324. For instance, first camera assembly 114A may capture an image covering one or more heating elements 326 of cooking appliance 300. In some such embodiments, the captured heating elements 326 and any utensil 322 placed on one of the heating elements 326 (or otherwise between cooking zone 320 and first camera assembly 114A) may be recorded and transmitted instantly to another portion of system (e.g., image monitor 112 or a remote server 404) as part of a real-time video feed. Thus, the real-time video feed may include a digital picture or representation 142 of the heating elements 326 or utensil 322. Optionally, first camera assembly 114A may be directed such that a line of sight is defined from first camera assembly 114A that is perpendicular to cooktop surface 324.

As shown, first camera assembly 114A may be positioned above cooking zone 320 (e.g., along the vertical direction V). In some such embodiments, first camera assembly 114A is mounted (e.g., fixedly or removably) to hood casing 116. A cross-brace 132 extending across hood casing 116 (e.g., along the transverse direction T) may support first camera assembly 114A. When assembled, first camera assembly 114A may be positioned directly above cooking zone 320 or cooktop surface 324.

In additional or alternative embodiments, one camera assembly (e.g., second camera assembly 114B) is directed away from cooking zone 320 or cooktop surface 324. In other words, second camera assembly 114B is oriented to capture light emitted or reflected from an area other than cooktop surface 324. In particular, second camera assembly 114B may be directed at the area in front of interactive assembly 110 or cooking appliance 300 (e.g., directly forward from cooking appliance 300 along the transverse direction T). Thus, second camera assembly 114B may selectively capture an image of the area in front of cooking zone 320. This area may correspond to or cover the location where a user would typically stand during use of cooking appliance 300. During use, a user's face or body may be captured by second camera assembly 114B while the user is standing directly in front of cooking appliance 300. Optionally, second camera assembly 114B may be directed such that a line of sight is defined from second camera assembly 114B that is non-orthogonal to cooktop surface 324 (e.g., between 0° and 45° relative to a plane parallel to cooktop surface 324). The captured images from second camera assembly 114B may be suitable for transmission to a remote device 102 or may be processed as part of one or more operations of interactive assembly 110, such as a gesture control signal for a portion of interactive assembly 110 (e.g., to engage a graphical user interface displayed at image monitor 112).

As shown, second camera assembly 114B may be positioned above cooking appliance 300 (e.g., along the vertical direction V). In some such embodiments, such as that illustrated in FIGS. 1 and 2, second camera assembly 114B is mounted (e.g., fixedly or removably) to a front portion of hood casing 116 (e.g., at image monitor 112). When assembled, second camera assembly 114B may be positioned directly above a portion of cooking appliance 300 (e.g., cooking zone 320 or cooktop surface 324) or, additionally, forward from cooking appliance 300 along the transverse direction T.

In optional embodiments, a lighting assembly 134 is provided above cooktop surface 324 (e.g., along the vertical direction V). For instance, lighting assembly 134 may be mounted to hood casing 116 (e.g., directly above cooking zone 320 or cooktop surface 324). Generally, lighting assembly 134 includes one or more selectable light sources directed toward cooking zone 320. In other words, lighting assembly 134 is oriented to project a light (as indicated at arrows 136) to cooking appliance 300 through open region 130 and illuminate at least a portion of cooking zone 320 (e.g., cooktop surface 324). The light sources may include any suitable light-emitting elements, such as one or more light emitting diode (LED), incandescent bulb, fluorescent bulb, halogen bulb, etc.

In some embodiments, image monitor 112 is provided as part of interactive assembly 110 above cooking zone 320 (e.g., along the vertical direction V). For instance, image monitor 112 may be mounted to hood casing 116 (e.g., directly above cooking appliance 300, cooking zone 320, or cooktop surface 324). Generally, image monitor 112 may be any suitable type of mechanism for visually presenting a digital image. For example, image monitor 112 may be a liquid crystal display (LCD), a plasma display panel (PDP), a cathode ray tube (CRT) display, etc. Thus, image monitor 112 includes an imaging surface 138 (e.g., screen or display panel) at which the digital image is presented or displayed as an optically-viewable picture (e.g., static image, dynamic or moving video, etc.) to a user (i.e., audience member or attendee).

The optically-viewable picture may correspond to any suitable signal or data received or stored by interactive assembly 110 (e.g., at controller 510A). As an example, image monitor 112 may present one or more instruction panels 220 (e.g., predefined regions of preset legible text, static images, or dynamic recorded video relating to an instructional demonstration).

As another example, image monitor 112 may present a remotely captured image, such as a live (e.g., real-time) dynamic video feed 222 that is received from a separate device (e.g., instructor device 210).

As yet another example, image monitor 112 may present a graphical user interface (GUI) that allows a user to select or manipulate various operational features of interactive assembly 110 or cooking appliance 300. During use of such GUI embodiments, a user may engage, select, or adjust the image presented at image monitor 112 through any suitable input, such as gesture controls detected through second camera assembly 114B, voice controls detected through one or more microphones 115, associated touch panels (e.g., capacitance or resistance touch panel) or sensors overlaid across imaging surface 138, etc. Optionally, a user may manually select or change the instruction panel 220 being presented at image monitor 112. Additionally or alternatively, a user may select one or more dynamic icons 144 to engage with or share data to one or more other components (e.g., instructor device 210). Such a selection may be made as a communication-request input prompting transmission of a communication-request signal to grant permission for interactive assembly 110 to transmit an audio or video signal exchange to another device (e.g., instructor device 210). In other words, a user touching a corresponding icon 144 may prompt interactive assembly 110 to transmit a communication-request signal to permit a user at interactive assembly 110 to transmit an audio or video signal to an instructor device 210 (e.g., directly or through a remote server 404) so that the user may communicate with instructor in an advantageously coordinated manner. Optionally, a user may select a dynamic icon 152 for an instructor poll 150 presented at image monitor 112.

As illustrated, the imaging surface 138 may generally face, or be directed, away from cooking appliance 300 (e.g., away from cooking zone 320 or cabinet 310). In particular, the imaging surface 138 is directed toward the area forward from the cooking appliance 300. During use, a user standing in front of cooking appliance 300 may thus see the optically-viewable picture (e.g., instruction panel 220, video feed 222, instructor-progress markers 226, graphical user interface icons, etc.) displayed at the imaging surface 138. Optionally, the imaging surface 138 may be positioned at a rearward non-orthogonal angle relative to the vertical direction V. In other words, the imaging surface 138 may be inclined such that an upper edge of the imaging surface 138 is closer to the rear end 128 of hood casing 116 than a lower edge of the imaging surface 138 is. In some such embodiments, the non-orthogonal angle is between 1° and 15° relative to the vertical direction V. In certain embodiments, the non-orthogonal angle is between 2° and 7° relative to the vertical direction V.

Figure 4:
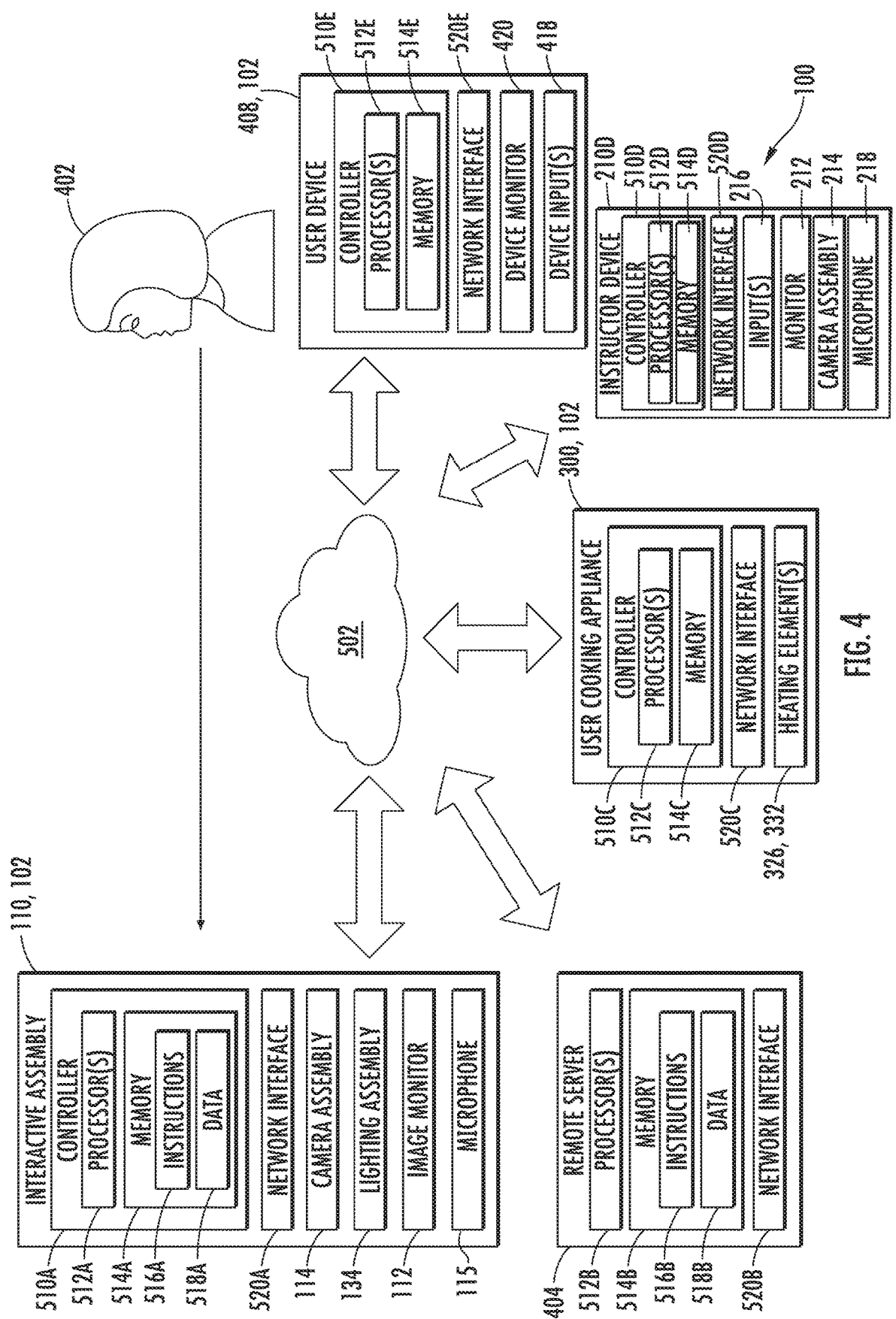
FIG. 4 provides a schematic view of a system for instructional demonstrations according to exemplary embodiments of the present disclosure.

FIG. 4 provides a schematic view of a system 100 for instructional demonstrations according to exemplary embodiments of the present disclosure. As shown, various components can be communicatively coupled with network 502 and various other nodes, such as instructor device 210 and one or more remote devices 102 (e.g., interactive assembly 110, cooking appliance 300, or one or more mobile user devices 408). Moreover, one or more users 402 (i.e., attendees or audience members) can be in operative communication with at least one remote device 102 (e.g., interactive assembly 110) by various methods, including voice control or gesture recognition, for example. Additionally, or alternatively, although network 502 is shown, one or more portions of the system (e.g., interactive assembly 110, cooking appliance 300, mobile user devices 408, instructor device 210, or other devices within system 100) may be communicatively coupled without network 502; rather, interactive assembly 110 and various other devices of the system can be communicatively coupled via any suitable wired or wireless means not over network 502, such as, for example, via physical wires, transceiving, transmitting, or receiving components.

As noted above, interactive assembly 110 may include a controller 510A communicatively coupled to one or more camera assemblies 114, lighting assemblies 134, and image monitors 112. Controller 510A may include one or more processors 512A and one or more memory devices 514A (i.e., memory). The one or more processors 512A can be any suitable processing device (e.g., a processor core, a microprocessor, an ASIC, a FPGA, a microcontroller, etc.) and can be one processor or a plurality of processors that are operatively connected. The memory device 514DA can include one or more non-transitory computer-readable storage mediums, such as RAM, ROM, EEPROM, EPROM, flash memory device, magnetic disks, etc., and combinations thereof. The memory devices 514A can store data 518A and instructions 516A that are executed by the processor 512A to cause interactive assembly 110 to perform operations. For example, instructions 516A could be instructions for voice recognition, receiving/transmitting audio signals from a microphone 115, instructions for gesture recognition, receiving/transmitting images or image signals from a camera assembly 114 (e.g., camera 114A or 114B—FIG. 1), directing activation of lighting assembly 134, or projecting images at image monitor 112. The memory devices 514A may also include data 518A, such as one or more received guided presentations (e.g., including a plurality of sequenced instruction panels), audio signals, video signals, instruction panels, etc., that can be retrieved, manipulated, created, or stored by processor 512A.

Controller 510A includes a network interface 520A such that interactive assembly 110 can connect to and communicate over one or more networks (e.g., network 502) with one or more network nodes. Network interface 520A can be an onboard component of controller 510A or it can be a separate, off board component. Controller 510A can also include one or more transmitting, receiving, or transceiving components for transmitting/receiving communications with other devices communicatively coupled with interactive assembly 110. Additionally or alternatively, one or more transmitting, receiving, or transceiving components can be located off board controller 510A.

Network 502 can be any suitable type of network, such as a local area network (e.g., intranet), wide area network (e.g., internet), low power wireless networks [e.g., Bluetooth Low Energy (BLE)], or some combination thereof and can include any number of wired or wireless links. In general, communication over network 502 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

In some embodiments, a remote server 404, such as a web server, is in operable communication with one or more instructor devices 210 or remote devices 102 (e.g., interactive assembly 110, cooking appliance 300, or mobile user devices 408). The server 404 can be used to host an engagement platform [e.g., for sharing or facilitating instructional demonstrations (such as cooking demonstrations), recipes, etc.]. Additionally or alternatively, the server 404 can be used to host an information database (e.g., for storing recipes or instruction data, including a plurality of sequenced instruction panels). The server 404 can be implemented using any suitable computing device(s). The server 404 may include one or more processors 512B and one or more memory devices 514B (i.e., memory). The one or more processors 512B can be any suitable processing device (e.g., a processor core, a microprocessor, an ASIC, a FPGA, a microcontroller, etc.) and can be one processor or a plurality of processors that are operatively connected. The memory device 512B can include one or more non-transitory computer-readable storage mediums, such as RAM, ROM, EEPROM, EPROM, flash memory devices, magnetic disks, etc., and combinations thereof. The memory devices 514B can store data 518B and instructions 516B which are executed by the processor 512B to cause remote server 404 to perform operations. For example, instructions 516B could be instructions for receiving/transmitting instructional or recipe data packets, transmitting/receiving video signals, transmitting/receiving progress signals (e.g., user-progress or instructor-progress signals), etc.

The memory devices 514B may also include data 518B, such as instructional or recipe data packets (e.g., which may be configured to initiate a guided presentation of a plurality of sequenced instruction panels at a separate remote device 102), identifier data (e.g., corresponding to a particular user, instructor, or remote device 102), etc., that can be retrieved, manipulated, created, or stored by processor 512B. The data 518B can be stored in one or more databases. The one or more databases can be connected to remote server 404 by a high bandwidth LAN or WAN, or can also be connected to remote server 404 through network 502. The one or more databases can be split up so that they are located in multiple locales.

Remote server 404 includes a network interface 520B such that interactive remote server 404 can connect to and communicate over one or more networks (e.g., network 502) with one or more network nodes. Network interface 520B can be an onboard component or it can be a separate, off board component. In turn, remote server 404 can exchange data with one or more nodes over the network 502. As an example, remote server 404 can exchange data with one or more remote devices 102 (e.g., interactive assembly 110, cooking appliance 300, or mobile user devices 408). As another example, remote server 404 can exchange data with one or more instructor devices 210. Generally, it is understood that remote server 404 may further exchange data with any number of client devices over the network 502. The client devices can be any suitable type of computing device, such as a general-purpose computer, special purpose computer, laptop, desktop, integrated circuit, mobile device, smartphone, tablet, or other suitable computing device. In some embodiments, data including images (e.g., static images or dynamic video), audio, or text may thus be exchanged between a remote device 102 and various separate client devices through remote server 404.

In some embodiments, an instructor device 210 is in operable communication with one or more remote devices 102 (e.g., interactive assembly 110, cooking appliance 300, or mobile user devices 408) via network 502. Optionally, instructor device 210 is in operable communication with and can communicate directly with one or more remote devices 102 via network 502. Alternatively, instructor device 210 is in operable communication with and can communicate indirectly with one or more remote devices 102 by communicating via network 502 with remote server 404, which in turn communicates with remote device(s) 102 via network 502.

Generally, instructor device 210 can be any suitable type of device for interacting with one or more remote users, such as a personal computing device (e.g., laptop or desktop), a mobile computing device (e.g., smartphone or tablet), or interactive assembly (e.g., including all or some of the components of interactive assembly 110, described above). Instructor device 210 includes a controller 510D. Controller 510D may include one or more processors 512D and one or more memory devices 514D (i.e., memory). The one or more processors 512D can be any suitable processing device (e.g., a processor core, a microprocessor, an ASIC, a FPGA, a microcontroller, etc.) and can be one processor or a plurality of processors that are operatively connected. The memory device 514D can include one or more non-transitory computer-readable storage mediums, such as RAM, ROM, EEPROM, EPROM, flash memory device, magnetic disks, etc., and combinations thereof. The memory devices 514D can store data and instructions that are executed by the processor 512D to cause instructor device 210 to perform operations. For example, instructions could be instructions for receiving/transmitting image or video signals from a camera assembly 214 (e.g., 214A or 214B), receiving/transmitting audio signals from a microphone 218, or projecting images at an instructor monitor 212. The memory devices 514D may also include data, such as one or more stored guided presentations (e.g., recipes or instruction data, including a plurality of sequenced instruction panels), audio signals, video signals, etc., that can be retrieved, manipulated, created, or stored by processor 512D.

Instructor device 210 can include one or more instructor inputs 216 (e.g., buttons, knobs, etc.). Optionally, one or more physical or virtual (e.g., touchscreen) buttons 216 may be set to a predetermined task. Moreover, instructor device 210 includes an instructor monitor 212 (e.g., LCD, PDP, CRT, etc.) configured to display graphical user interfaces or other visual representations to an instructor. As an example, instructor monitor 212 may present one or more leader panels 230 (e.g., predefined regions of preset legible text, static images, or dynamic recorded video relating to an instructional demonstration). Optionally, the leader panels 230 (or a selected portion thereof) of the instructor monitor 212 may, for example, dictate or control the position of one or more portion of image monitor 112 (e.g., instructor progress marker 226). As another example, instructor monitor 212 may present a locally captured image, such as a live (e.g., real-time) dynamic monitoring feed 240 that is received from one or more active camera assemblies 214A, 214B of instructor device 210 (e.g., to be transmitted as part of video feed 222). As yet another example, instructor monitor 212 may present a queue panel 232 displaying a communication queue of remote users or audience members waiting to be (or currently assigned) an active speaker role (i.e., "ACTIVELY TALKING") during an instructional demonstration. As still another example, instructor monitor 212 may present a graphical user interface (GUI) that includes one or more inputs 216 permitting the instructor to select or manipulate various operational features of instructor device 210. During use of such GUI embodiments, a user may engage, select, or adjust the image presented at instructor monitor 212 or image monitor 112 (e.g., via one or more signals transmitted through remote server 404) through any suitable input.

In optional embodiments, at least one input 216P (e.g., physical button or touchscreen GUI region) is programmed to initiate an instructor poll 150 at one or all of the connected remote devices 102 during the demonstration. For instance, an input 216P may be configured to transmit a polling signal from the instructor device 210 to the remote device(s) 102 in response to the instructor pressing the input 216P. At the remote device(s) 102, the polling signal may initiate a dynamic live poll 150 including a question to be answered by the attendees and, optionally, one or more dynamic icons 152 with which the attendees may respond. In some such embodiments, an attendee's response (e.g., selection of a particular dynamic icon 152) may initiate transmission of a response signal to be received at the instructor device 210.

The dynamic live poll 150 may be a preset poll (e.g., concerning whether an attendee has completed the current step of the demonstration) or a custom poll that can vary based on the direction of the instructor (e.g., from an attached keyboard or voice dictation).

In some embodiments, instructor device 210 includes one or more instructor camera assemblies 214A, 214B to capture images (e.g., dynamic video) of a portion of instructor device 210 or an area adjacent to instructor device 210. Generally, each instructor camera assembly 214A, 214B may be any type of device suitable for capturing a picture or video. As an example, each instructor camera assembly 214A, 214B may be a video camera or a digital camera with an electronic image sensor [e.g., a charge coupled device (CCD) or a CMOS sensor]. An instructor camera assembly 214A or 214B is generally provided in operable communication with controller 510D such that controller 510D may receive an image signal (e.g., video signal) from instructor camera assembly 214A or 214B corresponding to the picture(s) captured by camera assembly 214A or 214B. Once received by controller 510D, the image signal (e.g., video signal) may be further processed at controller 510D (e.g., for viewing at instructor monitor 212 as monitoring feed 240) or transmitted to a separate device (e.g., remote server 404) "live" or in real-time for remote viewing (e.g., at a remote device 102 as live video feed 222). In some embodiments, each camera assembly 214A, 214B is directed at a discrete location and, thus, provides a unique angle for transmission as part of a live video feed 222.

Although two discrete camera assemblies 214A and 214B are illustrated, it is understood that any suitable number of camera assemblies may be provided (e.g., at discrete locations or unique angles). Moreover, although camera assemblies 214A and 214B are shown as being directly mounted on a cabinet of instructor device 210, other embodiments may include one or more camera assemblies spaced apart from the rest of instructor device 210, yet still operably connected (i.e., to transmit signals thereto via a suitable electrical or wireless communications band) to the controller 510D, as would be understood.

In certain embodiments, instructor device 210 can selectively switch between the multiple camera assemblies 214A, 214B during the demonstration to change the viewing angle for the live video feed 222. Thus, instructor device 210 can actively and immediately change the camera assembly 214A or 214B (i.e., the active camera assembly) whose video signal is received by the remote device(s) 102 (e.g., each of the remote devices 102) after the live video feed 222 has already started. In some such embodiments, specific static inputs 216 (e.g., physical buttons or touchscreen GUI regions that are fixed for the duration of a demonstration) are programmed to switch or direct the active camera assembly to a specific corresponding one of the camera assemblies 214A or 214B. For instance, a first static input 216A (e.g., the number "1" on a keypad of instructor device 210) may be configured to transmit a first view signal, which initiates transmission of a video signal from the first camera assembly 214A for the live video feed 222 in response to the instructor pressing the first static input 216A; a second static input 216B (e.g., the number "2" on the keypad of instructor device 210) may be configured to initiate a second transmission of a video signal from the second camera assembly 214B for the live video feed 222 in response to the instructor pressing the second static input 216B. Thus, once a view signal is received (e.g., at the controller 510D) from the first or second static input 216A or 216B, the corresponding camera assembly 214A or 214B may transmit a video signal for live video feed 222 and halt any video signal from the other camera assembly 214B or 214A.

In certain embodiments, one or more microphones 218 (e.g., dynamic microphone, ribbon microphone, fiber-optic microphone, piezoelectric microphone, etc.) may be provided to capture and transmit audio signal(s). Optionally, a microphone 218 may be associated with one or more of the camera assemblies 214A, 214B to capture and transmit audio signal(s) coinciding (or otherwise corresponding) with the captured image signal or picture(s).

Controller 510D includes a network interface 520D such that instructor device 210 can connect to and communicate over one or more networks (e.g., network 502) with one or more network nodes. Network interface 520D can be an onboard component of controller 510D or it can be a separate, off board component. Controller 510D can also include one or more transmitting, receiving, or transceiving components for transmitting/receiving communications with other devices communicatively coupled with instructor device 210. Additionally or alternatively, one or more transmitting, receiving, or transceiving components can be located off board controller 510D.

Turning especially to FIGS. 5 through 11, in exemplary embodiments, instructor device 210 can communicate with (e.g., transmit/receive signals to/from) a remote device 102, such as interactive assembly 110. For example, instructor device 210 can transmit/receive signals as part of an instructional demonstration (e.g., remote cooking class) taught by an instructor in one location (e.g., building, city, area, etc.) and followed by users in another, spaced-apart location (e.g., another building, city, area, etc.). Prior to the class beginning, a set of instructions (e.g., recipe) can be provided to the remote device 102 (e.g., interactive assembly 110) so that a user can follow along as the instructor performs the same skill or recipe. The instructions may be provided as an instructional or recipe data packet that includes multiple discrete instruction panels arranged in a set sequence or order (e.g., first to last). Once received by the remote device 102, a user may advance/regress through the instruction panels 220 at his/her own pace and according to the sequence. Each instruction panel 220 may include preset legible text, static images, or dynamic video (e.g., prerecorded video) relating to a specific step of the recipe that the user should perform. The remote device 102 may display at least one of the instruction panels 220 at a time.

As the instruction or recipe (e.g., instruction panel 220) is being presented or displayed at the remote device 102, the instructor device 210 may also transmit a video signal (e.g., from an instructor camera assembly 214A or 214B) that can be received by the remote device 102. Once received by the remote device 102, the video signal may initiate a real-time or "live" video feed 222 so that the instructor's physical actions can be seen by the user. The real-time video feed 222 may be displayed in tandem with the instruction panel 220. Advantageously, the user may readily view both the recipe and the instructor as the user follows along.

In optional embodiments, the instructor can also provide an indication of what panel (e.g., instruction panel 220) or point of a recipe he or she is currently demonstrating. For example, the instructor device 210 may transmit an instructor-progress signal to the remote device 102. Additionally or alternatively, the instructor progress signal may correspond to at least a portion of the leader panel 230 (e.g., selected by the instructor at instructor device 210). At the remote device 102, the instructor-progress signal may cause an instructor-progress marker 226 to be presented or displayed (e.g., on monitor 112 in tandem with instruction panel 220 or real-time video feed 222).

During a demonstration, such as when a recipe (e.g., instruction panel 220) is being presented or displayed at the remote device 102 or audio is being transmitted from the instructor device 210, the remote device 102 may also transmit a corresponding signal that can be received by the instructor device 210 to coordinate communication. As an example, a communication request signal may be transmitted from a remote device 102 and received by the instructor device 210 or remote server 404 when a user or audience member wishes to engage with the instructor, such as to ask a question. In particular, the request may be understood as a request to be assigned the active speaker role, which permits whichever remote device 102 that is in the active speaker role to transmit audio or video to the instructor device 210 (e.g., while silencing all other remote devices 102). Such a communication request signal may be transmitted during a demonstration in response to a user selecting or pressing a request icon 144 on the remote device 102 (e.g., displayed on monitor 112 in tandem with instruction panel 220 or real-time video feed 222).

Figure 10:
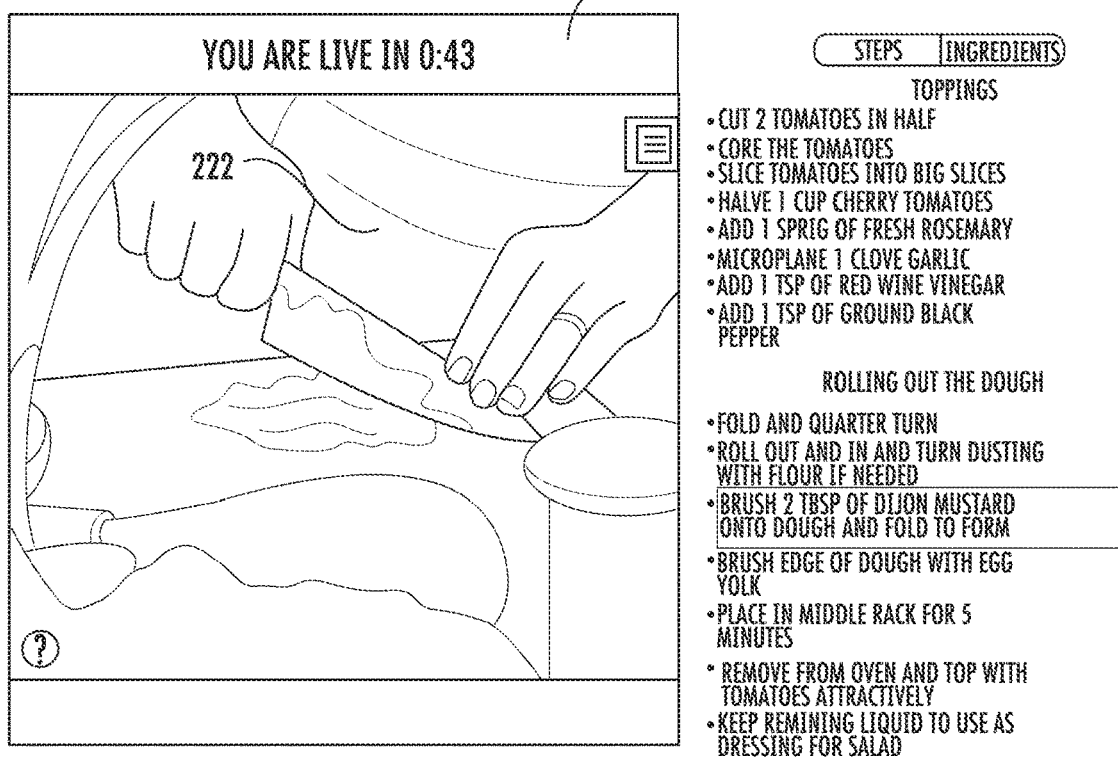
FIG. 10 provides a plan view of an interface portion of an audience device, prior to being granted active speaker status during a presentation, according to exemplary embodiments of the present disclosure.
Figure 11:
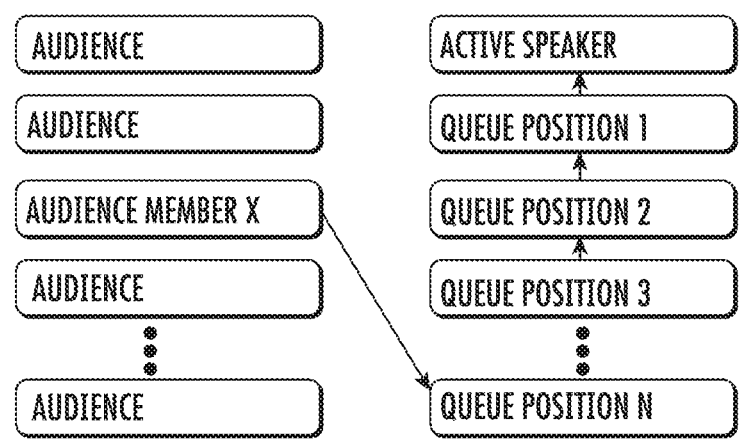
FIG. 11 provides a diagram illustrating organization of a communication queue for an active speaker role according to exemplary embodiments of the present disclosure.

Once the communication request has been received (e.g., at the instructor device 210 or remote server 404, the remote device 102 may be assigned a queue position relative to an active speaker role. As an example, as illustrated in FIG. 10, when multiple different remote audience devices 102 each submit a communication request, the different remote audience devices 102 will be assigned sequential queue positions and ordered according to when the their corresponding communication requests have been received or transmitted (e.g., if a timestamp of transmission is included with the communication request). As an additional or alternative example, the queue position of each requesting remote audience device 102 may be assigned using a weighting condition. For instance, the assigned position in the queue can be weighted for a total interaction time of a corresponding remote audience device 102, a number of requests made by the remote audience device (e.g., a number of times placed in queue), assigned priority status of the remote audience device 102, or any other suitable factor.

Generally, the queue position of each device 102 may determine when or in what order a particular remote device 102 may reach (i.e., be placed in) the active speaker role. Thus, the communication queue may organize all (or a preset maximum number) of the attendees or remote audience devices 102 that have requested to communicate with the instructor device 210.

Figure 6:
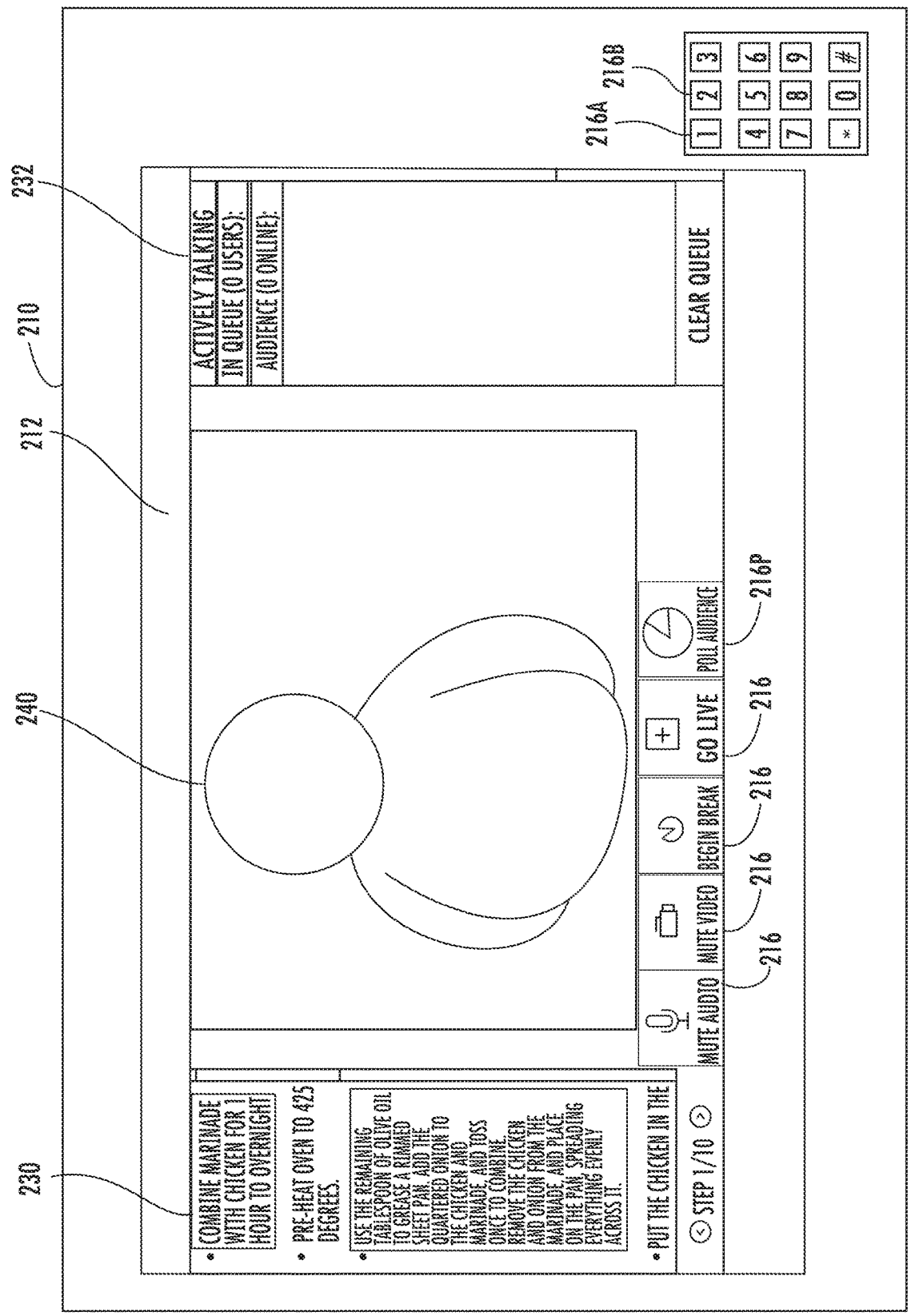
FIG. 6 provides a plan view of an interface portion of instructor device, prior to any audience members joining a presentation, according to exemplary embodiments of the present disclosure.
Figure 7:
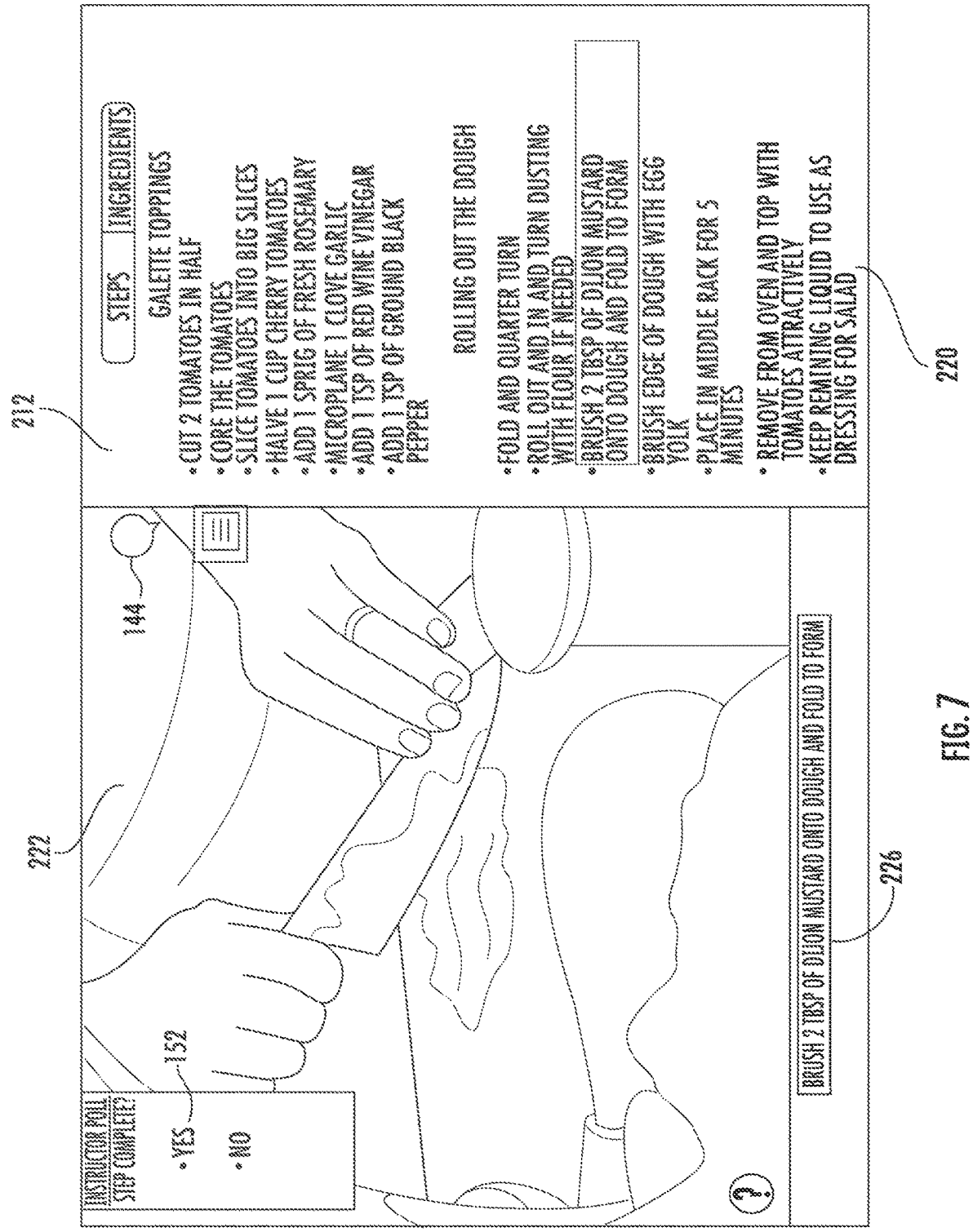
FIG. 7 provides a plan view of an interface portion of an audience device, prior to requesting engagement during a presentation, according to exemplary embodiments of the present disclosure.
Figure 8:
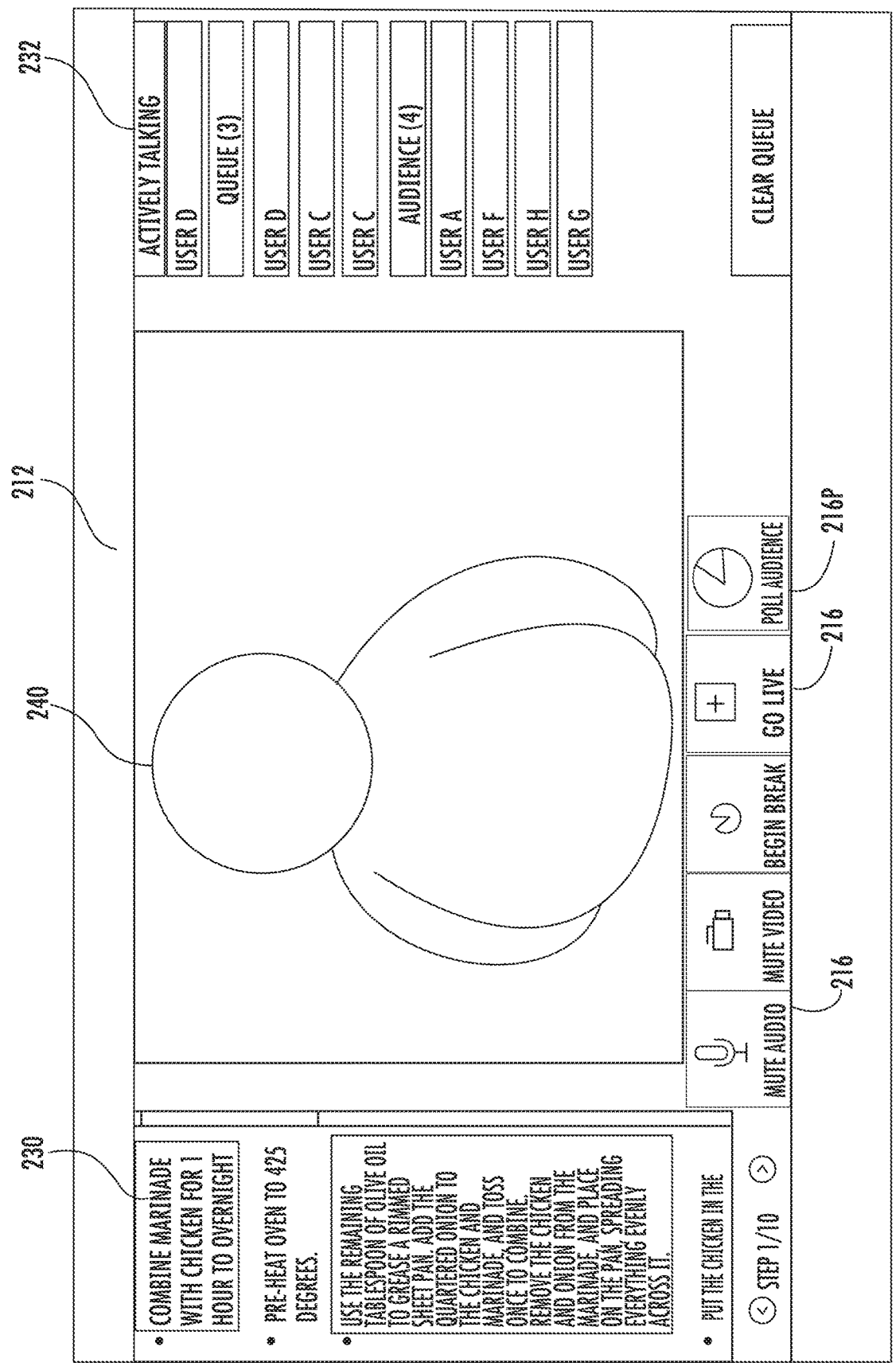
FIG. 8 provides a plan view of an interface portion of instructor device during a presentation according to exemplary embodiments of the present disclosure.

Turning especially to FIGS. 6 and 8, the communication queue may be displayed on the instructor device 210 (e.g., at a corresponding queue panel 232 of instructor monitor 212). Optionally, all other attendees (e.g., remote audience devices 102 that are receiving the live-video stream 222 during the demonstration, but are not in the communication queue) may be listed separately (e.g., below) the communication queue at the queue panel 232. Moreover, although the communications queue is described in terms of the remote devices 102, the queue may be labeled or further described according to the name of the corresponding audience member of a particular audience member. Thus, at least for purposes of the communications queue, the multiple remote devices may be interchangeably described as the users thereof.

After one or more remote devices 102 have been assigned queue positions, the assigned devices 102 may be indexed (e.g., automatically or without further direct input by the instructor or attendees) into the active speaker role. For instance, the devices 102 in the communication queue may be moved sequentially (e.g., one at a time or, alternatively, multiples at a time) along the communication queue. In other words, once a particular device 102 (e.g., second device) leaves or is removed from the active speaker role (and thus from the communication queue), another device 102 (e.g., first device) directly below the second device in the communication queue may be advanced into the active speaker role. Moreover, all the other devices 102 in the communication queue may be advanced relative to the active speaker role as the first device is advanced into the active speaker role. Optionally, each device 102 in the communication queue may be allocated a predetermined amount of time in which a particular device 102 may be permitted to remain in the active speaker role (i.e., a speaking time or speaker term). Additionally or alternatively, the instructor may manually remove a particular device 102 from the active speaker role (e.g., by selecting another remote device 102 in the communication queue at the instructor monitor 212).

Figure 9:
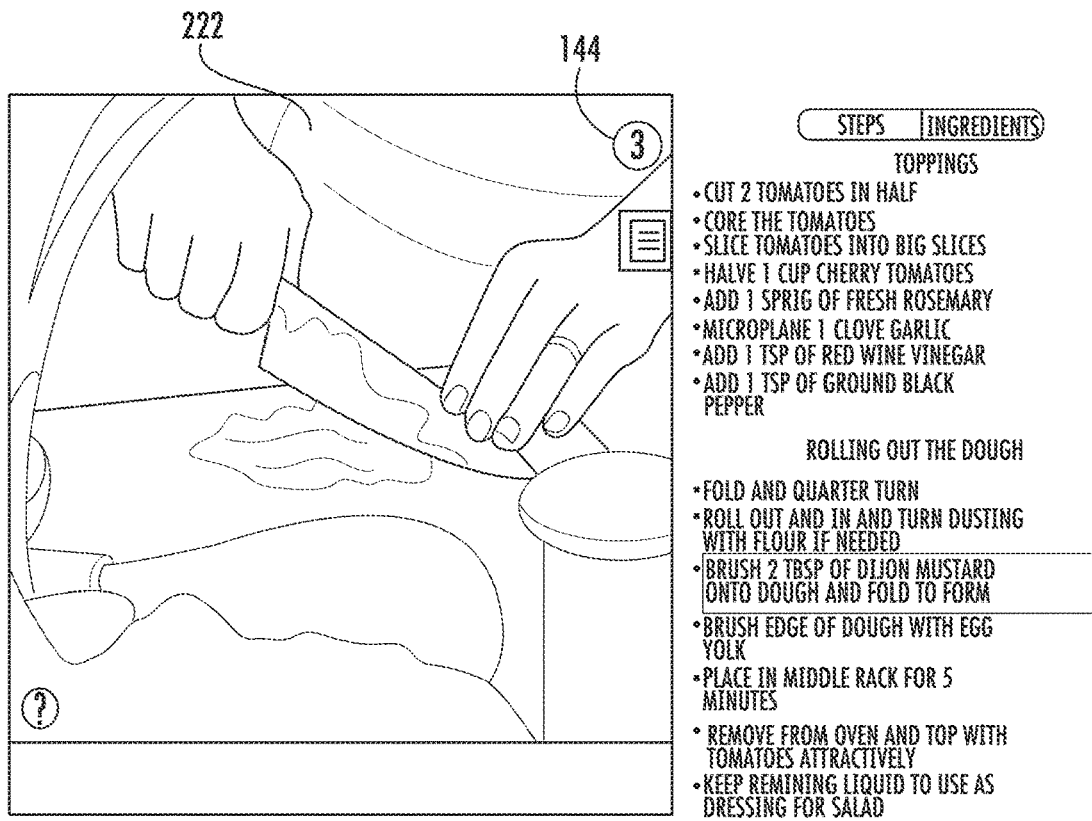
FIG. 9 provides a plan view of an interface portion of an audience device, after requesting active speaker status during a presentation, according to exemplary embodiments of the present disclosure.

As illustrated in FIG. 9, the assigned queue position of a particular remote device 102 relative to the active speaker role may be displayed on that particular remote device 102 (e.g., at monitor 112). For instance, the assigned queue position relative to the active speaker role may be displayed at the request icon 144. As the particular remote device 102 is indexed along the communication queue, the display of the relative position (e.g., 2, 3, 4, etc.) may be automatically updated and changed. Optionally, a particular user may notably see the relative position of his/her corresponding remote device 102 without being shown the entire communication queue.

In additional or alternative embodiments, such as those illustrated in FIG. 10, a particular remote device 102 may display a countdown (e.g., on a countdown panel 148) that indicates a time period until the remote audience device reaches the active speaker role. The countdown may be displayed as a numerical countdown or a graphic representation of elapsed time (e.g., an animated circle, status bar, etc.). If a predetermined speaking time is allocated for the active speaker role, the countdown panel 148 (e.g., on a first device) may display the countdown until the expected expiration of the predetermined speaking time allocated for a separate remote device 102 (e.g., second device). This separate or second device may be the device immediately preceding the particular or first device that is displaying the countdown. In other words, the separate or second device 102 may be device (N−1) in the communication queue while the particular or first device is device (N). Thus, a user of the first device may notably know and be prepared for the moment in which the first device will be placed in the active speaker role.

In further additional or alternative embodiments, a particular remote device 102 may display a countdown (e.g., on a countdown panel 148) that indicates a time period until that particular remote audience device 102 will no longer be in the active speaker role. The countdown may be displayed as a numerical countdown or a graphic representation of elapsed time (e.g., an animated circle, status bar, etc.). If a predetermined speaking time is allocated for the active speaker role, the countdown panel 148 (e.g., on a first device) may display the countdown until the expected expiration of the predetermined speaking time allocated for that same remote device 102 (e.g., first device). Thus, a user of the first device may notably know and be prepared for the moment in which his or her device will be lose the active speaker role.

Figure 5:
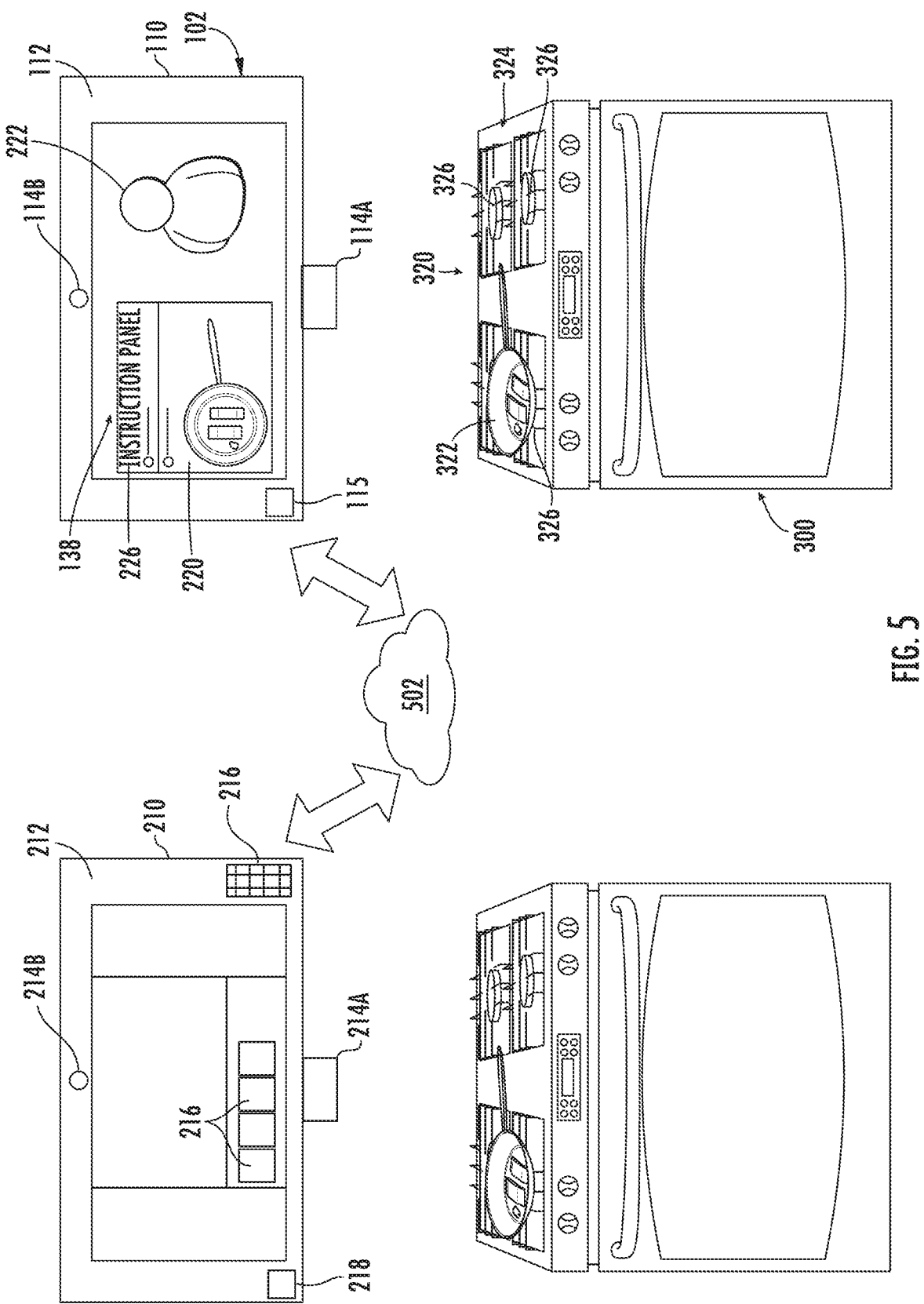
FIG. 5 provides a schematic view of a system for instructional demonstrations according to exemplary embodiments of the present disclosure.

It is noted that in some embodiments, such as those illustrated at FIG. 5, interactive assembly 110 is provided as a remote device 102 (e.g., for communication with remote server 404 to receive one or more instructional or recipe data packets, which may be configured to initiate a guided presentation of a plurality of sequenced instruction panels). Nonetheless, in additional or alterative embodiments, another device, such as a mobile user device 408 or cooking appliance 300, are provided as a remote device 102 (e.g., for communication with remote server 404 to receive one or more instructional or recipe data packets, which may be configured to initiate a guided presentation of a plurality of sequenced instruction panels). Moreover, although FIG. 4 illustrates a single interactive assembly 110, further embodiments may include any number of remote devices 102 (e.g., multiple discrete interactive assemblies, mobile user devices, or cooking appliances) in operable communication (e.g., with a common instructor device 210) via network 502.

Referring especially to FIG. 4, in optional embodiments, cooking appliance 300 is in operable communication with instructor device 210 via network 502 (e.g., wherein cooking appliance 300 is provided as a remote device 102). Optionally, cooking appliance 300 is in operable communication with and can communicate directly with instructor device 210 via network 502. Alternatively, cooking appliance 300 is in operable communication with and can communicate indirectly with instructor device 210 by communicating via network 502 with remote server 404, which in turn communicates with instructor device 210 via network 502. In turn, controller 510C of cooking appliance 300 may exchange signals with instructor device 210. In some embodiments, one or more portions of cooking appliance 300 can be controlled according to signals received from controller 510D of instructor device 210. For instance, a monitor of cooking appliance 300 may project or display instruction panels of a guided presentation as well as a real-time video feed 222 or icons based on one or more signals received from controller 510D of instructor device 210 or remote server 404 (e.g., similar to what is described above with respect to interactive assembly 110).

In certain embodiments, a user device 408 is communicatively coupled with network 502 such that user devices 408 can communicate with instructor device 210. User devices 408 can communicate directly with instructor device 210 via network 502. Alternatively, user devices 408 can communicate indirectly with instructor device 210 by communicating via network 502 with remote server 404, which in turn communicates with instructor device 210 via network 502. Moreover, user 402 can be in operative communication with user devices 408 such that user 402 can communicate with instructor device 210 via user devices 408.

User device 408 can be any type of device, such as, for example, a personal computing device (e.g., laptop or desktop), a mobile computing device (e.g., smartphone or tablet), a gaming console or controller, a wearable computing device, an embedded computing device, a remote, or any other suitable type of user computing device. User device 408 can include one or more user device controllers 510E. Controller 510E can include one or more processors 512E and one or more memory devices 514E. The one or more processors 512E can be any suitable processing device (e.g., a processor core, a microprocessor, an ASIC, a FPGA, a controller, a microcontroller, etc.) and can be one processor or a plurality of processors that are operatively connected. The memory device (i.e., memory) can include one or more non-transitory computer-readable storage mediums, such as RAM, ROM, EEPROM, EPROM, flash memory devices, magnetic disks, etc., and combinations thereof. The memory can store data and instructions which are executed by the processor 512E to cause user device 408 to perform operations. Controller 510E may include a user device network interface 520E such that user device 408 can connect to and communicate over one or more networks (e.g., network 502) with one or more network nodes. Network interface 520E can be an onboard component of controller 510E or it can be a separate, off board component. Controller 510E can also include one or more transmitting, receiving, or transceiving components for transmitting/receiving communications with other devices communicatively coupled with user device 408. Additionally or alternatively, one or more transmitting, receiving, or transceiving components can be located off board controller 510E.

User device 408 can include one or more user inputs 418 (e.g., buttons, knobs, one or more cameras, etc.) or a monitor 420 configured to display graphical user interfaces or other visual representations to user. For example, monitor 420 can display graphical user interfaces corresponding to operational features of interactive assembly 110 such that user may manipulate or select the features to operate interactive assembly 110. Monitor 420 can be a touch sensitive component (e.g., a touch-sensitive display screen or a touch pad) that is sensitive to the touch of a user input object (e.g., a finger or a stylus). For example, a user 402 may touch the monitor 420 with his or her finger and type in a series of numbers on the monitor 420. In addition, motion of the user input object relative to the monitor 420 can enable user 402 to provide input to user device 408. User device 408 may provide other suitable methods for providing input to user device 408 as well. Moreover, user device 408 can include one or more speakers, one or more cameras, or more than one microphones such that user device 408 is configured with voice control, motion detection, and other functionality.

As noted above, user device 408 may communicate with instructor device 210 (e.g., directly or indirectly). In turn, controller 510E of user device 408 may exchange signals with instructor device 210. In some embodiments, one or more portions of user device 408 can be controlled according to signals received from controller 510D of instructor device 210. For instance, the monitor 420 may project or display instruction panels of a guided presentation as well as a real-time video feed 222 or icons based on one or more signals received from controller 510D of instructor device 210 or remote server 404 (e.g., similar to what is described above with respect to interactive assembly 110).

Generally, a particular user 402 may be in operative communication with a remote device 102 (e.g., interactive assembly 110, cooking appliance 300, or one or more user devices 408). In some exemplary embodiments, user 402 can communicate with remote device(s) 102 (e.g., interactive assembly 110) using voice control. User 402 may also be in operative communication via other methods as well, such as visual communication.

Figure 12:
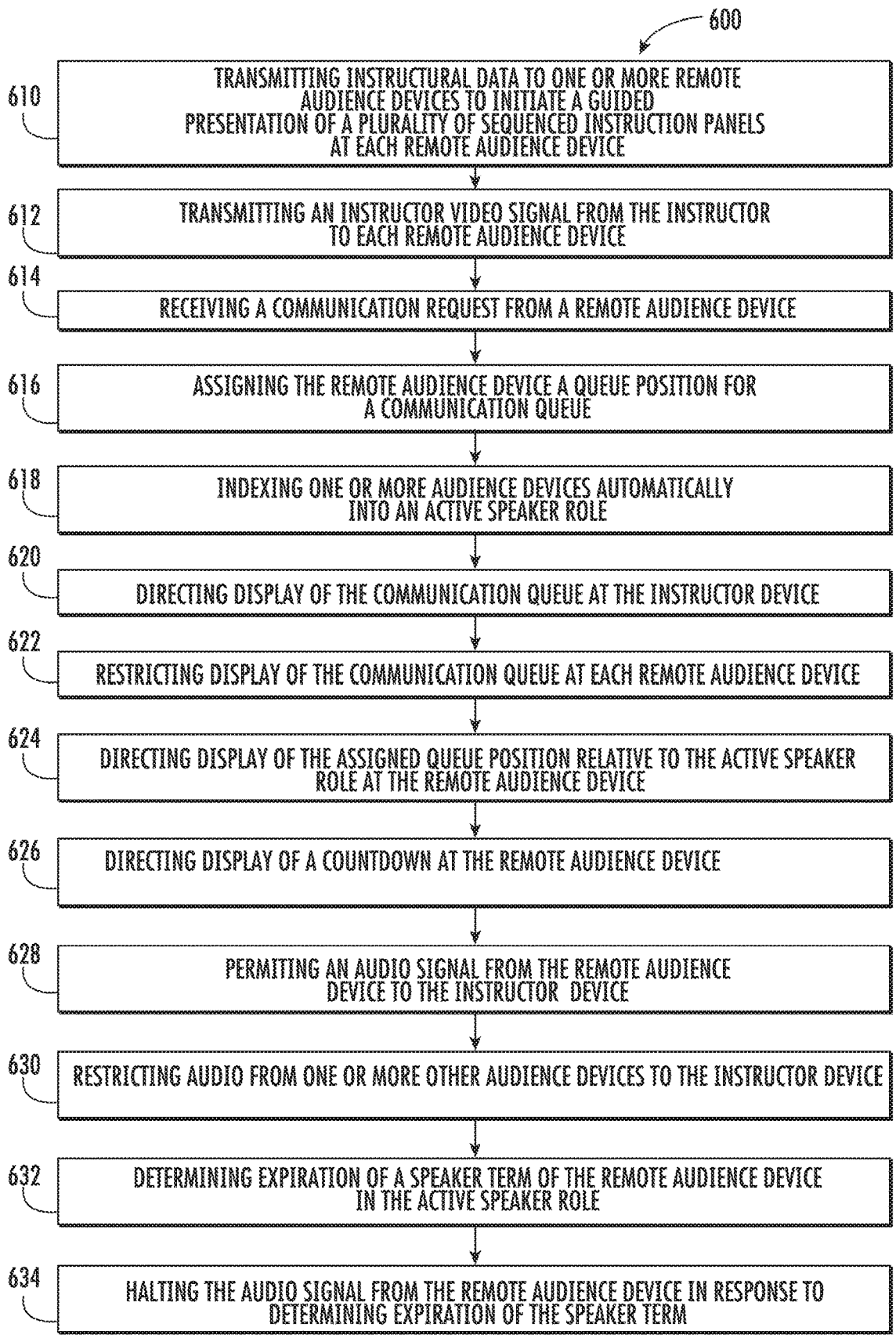
FIG. 12 provides a flow chart illustrating a method of operating a system according to exemplary embodiments of the present disclosure.

Referring now to FIG. 12, various methods may be provided for use with system 100 (FIG. 1) in accordance with the present disclosure. In general, the various steps of methods as disclosed herein may, in exemplary embodiments, be performed by the controller 510D (FIG. 4) or the controller of the remote server 404 as part of an operation that the instructor device 210 or remote server 404 is configured to initiate (e.g., an instructional demonstration coordinated between multiple devices). During such methods, the performing controller may receive input signals and transmit output signals from various other components of the system 100. For example, controller 510D may send signals to and receive signals from remote server 404, interactive assembly 110, cooking appliance 300, or user devices 408, as well as components within instructor device 210. Thus, controller 510D may transmit signals to and receive signals from one or more remote devices 102. Such transmitting/receiving may occur directly or through remote server 404.

In particular, the present disclosure is further directed to methods, as indicated by 600, for operating system 100. Such methods advantageously facilitate guided or interactive cooking instruction (e.g., an instructional demonstration) between an instructor and one or more remote users. In certain embodiments, such methods may advantageously coordinate communication between an instructor at instructor device 210 and one or more users at respective remote devices 102 (e.g., interactive assembly 110, cooking appliance 300, or user device 408), such as while a user is actively engaged with (e.g., using) a cooking appliance 300.

FIG. 12 depicts steps performed in a particular order for purpose of illustration and discussion. Those of ordinary skill in the art, using the disclosures provided herein, will understand that (except as otherwise explicitly or implicitly indicated) the steps of any of the methods disclosed herein can be modified, adapted, rearranged, omitted, or expanded in various ways without deviating from the scope of the present disclosure.

As shown in FIG. 12, at 610, method 600 includes transmitting instructional data (e.g., one or more data packets) to one or more remote audience devices for an instructional demonstration or class (e.g., a cooking class to teach a specific recipe or another instructional demonstration to teach a specific craft or skill). The instructional data may be configured to initiate a guided presentation of a plurality of sequenced instruction panels at each remote audience device. Thus, the instructional data may generally include multiple panels or pages to be presented or displayed in a set order or sequence at the remote audience device devices. In some embodiments, the guided presentation provides or relates to a recipe that an instructor and remote users (i.e., attendees or audience members) will each be following.

Each instruction panel may illustrate one or more unique steps or associated information for the recipe or demonstration. In some embodiments, the instruction panels include user-viewable media that is preset within the instruction panel and relates to the instructional demonstration. As an example, the instruction panels may include preset legible text relating to the instructional demonstration (e.g., words describing a recipe step). As another example, the instruction panels may include one or more preset static images relating to the instructional demonstration (e.g., pictures demonstrating a recipe step or state of a food product after a recipe step). As yet another example, the instruction panels may include dynamic video (e.g., prerecorded video of a recipe step being performed). Generally, while a single instruction panel is presented or displayed (i.e., as a currently displayed instruction panel), the single instruction panel may only occupy a portion of a monitor of the remote device (e.g., image monitor of a remote audience device), as described above.

At 612, the method 600 includes transmitting an instructor video signal from the instructor device to each remote audience device (e.g., directly or, alternatively, indirectly through a remote server). As described above, the instructor device may include one or more camera assemblies. The video signal at 620 may originate at or correspond to one or more of the camera assemblies of the instructor device. As would be understood, the video signal may include multiple sequenced images captured by the camera assembly. In some embodiments, the captured video signal is transmitted in real-time (e.g., continuously or instantly). For instance, the video signal may be received by the controller of each remote audience device or another node of the system (e.g., the remote server). A real-time dynamic video signal or stream may be transmitted based on a view or image detected at the camera assembly of the instructor device.

The video signal is configured to initiate a real-time video feed at the remote device. Thus, the real-time feed may provide live video (e.g., continuously-updating digital images) that a user may view on the remote device (e.g., image monitor in front of the cooking zone of the cooking appliance). Optionally, associated audio may be included with or accompany the video. Moreover, the real-time feed may be provided in tandem with the guided presentation. Thus, the real-time feed may be presented or displayed at the same time as at least one instruction panel. This may allow a user to view the recipe or instruction at the same time (and on the same monitor or screen) as the real-time feed.

In optional embodiments, the method 600 includes transmitting an instructor-progress signal from the instructor device to each remote audience device. The instructor-progress signal may initiate presentation of an instructor progress marker at a remote audience device. As presented, the instructor progress marker may indicate the currently-displayed recipe panel at the instructor device. As an example, the instructor progress marker may display a number or character associated with the specific instruction panel. As another example, the instructor progress marker may provide or reproduce a portion (e.g., all or a mere sub-portion) of the instruction panel being displayed at the instructor device (i.e., the currently-displayed panel of the instructor device). A remote user may thus be provided with an indication of what step the instructor is currently trying to explain or perform.

At 614, the method 600 includes receiving a communication request from a particular remote audience device (e.g., first device). The communication request may be transmitted to the remote server or instructor device, for instance, in response to a user manually selecting a corresponding icon or input at a corresponding first device during the demonstration (e.g., in tandem with the live video feed). Moreover, the communication request may indicate that the user wishes to speak or otherwise communicate with the instructor (e.g., to ask a question).

At 616, the method 600 includes assigning the remote audience device (e.g., first device) a queue position for a communication queue. As described above, once the communication request is received (e.g., in response thereto), the requesting audience device (e.g., first device) may be organized in the communication queue. For instance, the first device may be assigned the next number or position in a set sequence. In other words, the first device may be given the next available position and placed at the end of the line for the communication queue. If the first device is the only remote audience device to have transmitted a communication request, the first device may be assigned the first queue position.

At 618, the method 600 includes indexing one or more audience devices automatically into an active speaker role. For instance, as described above, the devices in the communication queue may be moved sequentially along the communication queue. The sequential indexing may progress one at a time (e.g., such that only one remote audience device is in the active speaker role at any given moment) or, alternatively, multiples at a time (e.g., such that two or more remote audience devices may be in the active speaker role at any given moment). If multiples are permitted, the maximum limit of active speakers may be predetermined, such as a relatively low number (e.g., 5, 4, 3, or 2). If no other remote audience device is provided in the active speaker role when the communication request is received at 614, the first device may be immediately placed in the active speaker role.

At 620, the method 600 includes directing display of the communication queue at the instructor device. For instance, the communication queue may be displayed as a list on a queue panel of the instructor device. The displayed communication queue may, thus, show an instructor who is currently in the active speaker role, who wishes to assume the active speaker role, and what position multiple users have been assigned on the communication queue. As the communication queue is indexed, the display of the active speaker role and the rest of the communication queue may be updated accordingly.

At 622, the method 600 includes restricting display of the communication queue at each remote audience device. Thus, in some embodiments, the attendees of the demonstration may notably be prevented from seeing the entirety of the communication queue, which might otherwise distract or frustrate the attendees.

At 624, the method 600 includes directing display of the assigned queue position relative to the active speaker role at the remote audience device (e.g., even if the entire communication queue is not displayed at the remote audience devices). For instance, a particular user's position relative to the active speaker role may be displayed at a request icon, as described above.

At 626, the method 600 includes directing display of a countdown at the remote audience device indicating a time period until expiration of a device in the active speaker role. As an example, 626 may include directing display of a countdown until a particular remote audience device reaches the active speaker role or loses the active speaker role. As described above, the countdown may be displayed as a numerical countdown or a graphic representation of elapsed time (e.g., an animated circle or status bar). Moreover, if a predetermined speaker term is allocated for the active speaker role, the countdown panel may display the countdown until the expected expiration of the speaker term time allocated for that same remote audience device (e.g., first device) or a separate remote audience device (e.g., second device).

At 628, the method 600 includes permitting an audio signal from the remote audience device to the instructor device in response to the remote audience device reaching the active speaker role. In other words, audio from the microphone of the remote audience device in the active speaker role may be transmitted from the remote audience (e.g., first device) to the instructor device (e.g., directly or, alternatively, through the remote server). Optionally, the audio of the device in the active speaker role may be restricted to the instructor device alone, and thus keep attendees at the other remote audience devices (e.g., second remote device) from hearing the active speaker. Alternatively, the audio of the device in the active speaker role may be transmitted to the instructor device and the other remote audience devices, and thus permit attendees at the other remote audience devices (e.g., second remote device) to hear the active speaker.

In certain embodiments, a participant video signal from the active speaker (e.g., first device) may accompany the audio signal. In other words, the participant video signal may be permitted in tandem with the audio signal of the active speaker (e.g., as a video call interaction).

At 630, the method 600 includes restricting audio from one or more other audience devices to the instructor device when a particular remote audience device (e.g., first device) is in the active speaker role. Thus, while the first device is in the active speaker role, other remote audience devices may be muted and, thus, notably prevented from interrupting or causing confusion for the instructor. Optionally, audio from all of the remote audience devices may be restricted (e.g., muted) at the start of the demonstration. Alternatively, audio from the one or more other audience devices may be restricted in response to the first device reaching the active speaker role.

At 632, the method 600 includes determining expiration of a speaker term of the remote audience device in the active speaker role. For instance, as described above, the speaker term may be a predetermined period of time in which a particular audience may continuously be in the active speaker role. Thus, 632 may include determining that the predetermined period of time has elapsed following 628. Additionally or alternatively, 632 may include receiving a termination signal from the instructor device. As an example, the speaker term may be an indefinite or open-ended period with no predetermined expiration point. Thus, the instructor may be required to manually select termination of the speaker term (e.g., via a corresponding icon or option on the instructor device) or rely on an attendee in the active speaker role to "hang up" or manually end the speaker term on the corresponding remote audience device. As another example, an instructor may wish to terminate the speaker term prior to a predetermined period of time elapsing and, thus, may manually select termination of the speaker term (e.g., via a corresponding icon or option on the instructor device).

At 634, the method 600 includes halting the audio signal from the remote audience device (e.g., first device) in response to determining expiration of the speaker term. In other words, in response to 632, the particular or first remote audience device may be muted and moved out of the active speaker role. Optionally, the proceeding remote audience device (e.g., device (N+1)) on the communication queue may be indexed into the active speaker role, as would be understood in light of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of coordinating an instructional demonstration between an instructor device and a remote audience device, the method comprising:
    transmitting an instructor video signal from the instructor device;
    receiving a communication request from the remote audience device;
    restricting display of a communication queue at the remote audience device;
    assigning the remote audience device a queue position for the communication queue according to the received communication request;
    directing display of the assigned queue position relative to the active speaker role at the remote audience device while a remaining portion of the communication queue is restricted from display at the remote audience device;
    indexing one or more audience devices automatically into an active speaker role according to the communication queue;
    directing display of a countdown at the remote audience device indicating a time period until expiration of a device in the active speaker role; and
    permitting an audio signal from the remote audience device to the instructor device in response to the remote audience device reaching the active speaker role.

2. The method of claim 1, further comprising:
    determining expiration of a speaker term of the remote audience device in the active speaker role; and
    halting the audio signal from the remote audience device in response to determining expiration of the speaker term.

3. The method of claim 2, wherein the speaker term is a predetermined period of time.

4. The method of claim 2, wherein determining expiration of the speaker term comprises receiving a termination signal from the instructor device.

5. The method of claim 1, further comprising:
    permitting a participant video signal from the remote audience device to the instructor device in tandem with the audio signal from the remote audience device.

6. The method of claim 1, further comprising:
    transmitting instructional data to the remote audience device to initiate a guided presentation of a plurality of sequenced instruction panels at the remote audience device in tandem with a live video feed initiated by the instructor video signal, wherein the instructional data comprises preset legible text relating to the instructional demonstration.

7. The method of claim 1, further comprising:
    transmitting instructional data to the remote audience device to initiate a guided presentation of a plurality of sequenced instruction panels at the remote audience device in tandem with a live video feed initiated by the instructor video signal, wherein the instructional data comprises a preset static image relating to the instructional demonstration.

8. The method of claim 1, further comprising:
    transmitting instructional data to the remote audience device to initiate a guided presentation of a plurality of sequenced instruction panels at the remote audience device in tandem with a live video feed initiated by the instructor video signal, wherein the instructional data comprises a preset dynamic video.

9. The method of claim 1, further comprising:
transmitting an instructor-progress signal configured to initiate presentation of an instructor progress marker at the remote audience device.

10. A method of coordinating an instructional demonstration between an instructor device and a plurality of remote audience devices, the method comprising:
transmitting an instructor video signal from the instructor device to each remote audience device of the plurality of remote audience devices;
receiving a communication request from a first device of the plurality of remote audience devices;
assigning the first device a queue position for a communication queue according to the received communication request;
indexing one or more audience devices of the plurality of remote audience devices automatically into an active speaker role according to the communication queue;
directing display of the communication queue, including the assigned queue position of the first device and the active speaker role, at the instructor device;
restricting display of the communication queue at each remote audience device of the plurality of remote audience devices;
directing display of the assigned queue position relative to the active speaker role at the first device while a remaining portion of the communication queue is restricted from display at the first device;
permitting an audio signal from the first device to the instructor device in response to the first device reaching the active speaker role; and
restricting audio from one or more other audience devices to the instructor device when the first device is in the active speaker role.

11. The method of claim 10, further comprising:
determining expiration of a speaker term of the first device in the active speaker role; and
halting the audio signal from the first device in response to determining expiration of the speaker term.

12. The method of claim 11, wherein the speaker term is a predetermined period of time.

13. The method of claim 11, wherein determining expiration of the speaker term comprises receiving a termination signal from the instructor device.

14. The method of claim 10, further comprising:
permitting a participant video signal from the first device to the instructor device in tandem with the audio signal from the first device.

15. The method of claim 10, further comprising:
transmitting instructional data to the first device to initiate a guided presentation of a plurality of sequenced instruction panels at the first device in tandem with a live video feed initiated by the instructor video signal, wherein the instructional data comprises preset legible text relating to the instructional demonstration.

16. The method of claim 10, further comprising:
transmitting instructional data to the first device to initiate a guided presentation of a plurality of sequenced instruction panels at the first device in tandem with a live video feed initiated by the instructor video signal, wherein the instructional data comprises a preset static image relating to the instructional demonstration.

17. The method of claim 10, further comprising:
transmitting instructional data to the first device to initiate a guided presentation of a plurality of sequenced instruction panels at the first device in tandem with a live video feed initiated by the instructor video signal, wherein the instructional data comprises a preset dynamic video.

18. The method of claim 10, further comprising:
transmitting an instructor-progress signal configured to initiate presentation of an instructor progress marker at each remote audience device of the plurality of remote audience devices.

* * * * *